D. LOW & A. R. THOMPSON.
COMBINED ASPARAGUS GRADER AND CUTTER.
APPLICATION FILED MAY 1, 1918.

1,282,250.

Patented Oct. 22, 1918.
2 SHEETS—SHEET 1.

WITNESS:
Wm F. Drew

INVENTORS.
David Low
Albert R. Thompson
BY
Booth & Booth
ATTORNEYS.

UNITED STATES PATENT OFFICE.

DAVID LOW AND ALBERT R. THOMPSON, OF SAN JOSE, CALIFORNIA; SAID THOMPSON ASSIGNOR TO SAID LOW.

COMBINED ASPARAGUS GRADER AND CUTTER.

1,282,250.

Specification of Letters Patent. Patented Oct. 22, 1918.

Application filed May 1, 1918. Serial No. 231,941.

*To all whom it may concern:*

Be it known that we, DAVID LOW and ALBERT R. THOMPSON, citizens of the United States, residing at San Jose, in the county of Santa Clara and State of California, have invented certain new and useful Improvements in Combined Asparagus Graders and Cutters, of which the following is a specification.

Our invention relates to machines by which elongated vegetables, such, for example, as asparagus, are prepared for canning, by being reduced to uniform length and graded as to thickness. In such machines the initial care of the farmer in so packing his boxes that the shoots lie in uniform relation, that is, with their tips all in the same direction, is taken advantage of to preserve and maintain this relation throughout their progress through the machine; wherefore it is possible to intimately incorporate in one machine the means for and the functions of both grading to thickness and cutting to length without destroying the initial relation of the shoots, but delivering them uniformly in this regard.

In a previous Patent No. 1,257,719, Feb. 26, 1918, we disclose a machine for this purpose in which the combined means and functions were so related that the cutting preceded the grading. We have found however, that in some cases and for many purposes it is advisable to have the grading precede the cutting. This, then, is the object of our present invention, and to this end our invention consists in the novel combined asparagus grader and cutter which we shall hereinafter fully describe by reference to the accompanying drawings, in which—

Fig. 3 is a longitudinal detail partly in elevation of the grading means taken on the line 3—3 of Fig. 1.

Figure 1:
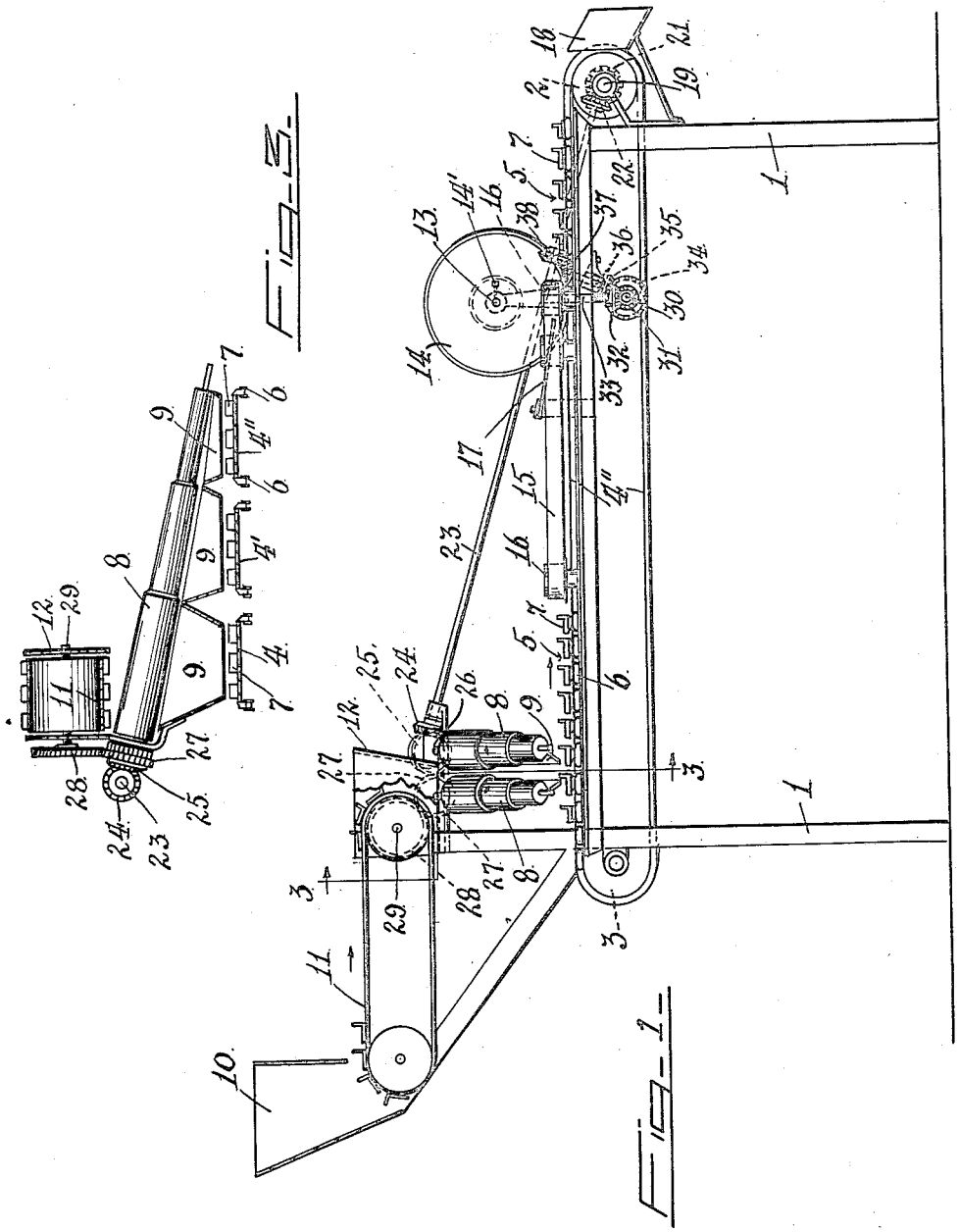
Figure 1 is a side elevation of our machine.
Figure 2:
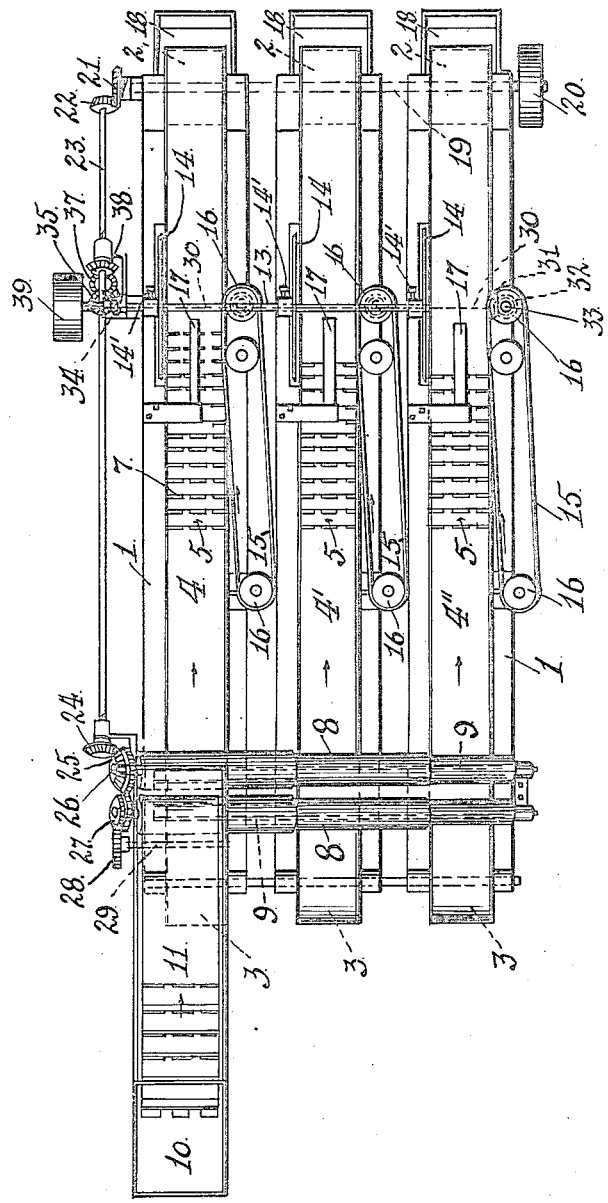
Fig. 2 is a top plan of the same.

1 is the frame of the machine. Upon terminal pulleys 2 and 3 carried by the frame are the endless traveling carriers 4, 4′ and 4″. There may be two or more of these carriers, according to the number of grades desired. We have, for illustration, here shown three carriers. The carriers are alike, and a description of one will apply to all. The surface of the carrier is formed or provided with transverse, parallel spaced pockets 5, and said carrier comprises a chain foundation 6, adapted for regular, uniform travel over the pulleys, and spaced angle-iron members 7 constituting the pockets, which latter are open at each end.

8, is a grader. This may be of any suitable form. It is here shown as comprising a pair of stepped rolls, adapted for three grades. The grader lies above and across the head ends of the carrier series, and under each step of grader is a hopper 9 which receives the shoots from the different steps, keeps them straight and delivers them to the pockets of the respective carriers. The grader rolls are downwardly inclined, to enable the shoots to pass over them by gravity, and if desired, in order to equalize the drop of the shoots from each step to the underlying carrier, these latter may be arranged in different horizontal planes, though we have here shown them as in the same horizontal plane, as the distance of the drop is, in practice, negligible.

10 is the main feed hopper, from which a feed pocket-carrier 11 takes the shoots and delivers them through a guide chute 12 to the head of the grader rolls.

Upon a shaft 13 are mounted the cutters 14, one for each carrier. These cutters rotate in vertical planes beside one end of the carrier pockets, and they are best mounted adjustably on the shaft, as is indicated by the set screws 14′, so that they may be moved to cut varying lengths.

Associated with the other open end of the pockets of each carrier is a traveling evener belt 15. There are three of these one for each carrier, and each is mounted upon pulleys 16 which direct it convergently to the side of the carrier.

17 is a presser finger to hold the shoots in the carrier pockets. 18 is a discharge chute at the end of each carrier. The driving connections may be of any suitable character, and may be varied to suit good practice. For illustration merely, we have here shown the following. 19 is a shaft, which carries the driving pulleys 2 at the foot of the carriers. 20 is a pulley on said shaft to drive it, and thereby drive the carriers 4, 4′ and 4″. One end of the shaft 19 has a bevel gear 21 which, meshing with a bevel gear 22, drives a shaft 23 which carries at its other end a bevel gear 24 meshing with a bevel gear 25 on the shaft 26 of one of the grader rolls 8, the two rolls being geared together by gears 27, whereby they are driven.

One of the grade-roll gears 27 meshes with a gear 28 on the driving shaft 29 of the feed carrier 11, thereby driving said carrier.

The evener belts 15 are driven by a cross-shaft 30, which carries bevel pinions 31 meshing with bevel pinions 32 on the lower ends of the drive shafts 33 of said belts.

One end of the cross-shaft 30 carries a bevel pinion 34 which meshes with a bevel pinion 35 on the lower end of a shaft 36, the upper end of which carries a pinion 37 meshing with a pinion 38 on the shaft 23. The cutters, which rotate at relatively high speed, are driven by a pulley 39 on the cutter shaft 13.

The operation of the machine is as follows:—

The asparagus shoots in the boxes from the farm all lie in the same direction with respect to tips and butts, such being the careful practice of the producer. This uniformity is preserved by the operator of the machine who supplies them to the main feed hopper 10. In this same relation they are picked up by the pockets of the feed-carrier 11, and are advanced one by one to the guide chute 12, through which they drop, tips downward, on to the head end of the grader rolls 8. Shoots small enough to pass between the rolls at the first step will drop through, and will be accurately directed by the underlying guide hopper 9 into the pockets of the first carrier 4. The relation of tips and butts being still preserved, the shoots are carried forward, and their tips coming in contact with the evener belt 15, said shoots are moved over sidewise in the pockets, until all their tips are even, being about flush with the side of the carrier. Their butts, now meeting the cutter 14 are cut off evenly; and the shoots, thus reduced to uniform length, are finally dropped out by gravity from the end of the carrier, into the discharge chute 18. Shoots thicker than those whose course we have just followed will slip down on the grader rolls to the second step, and will by falling through said step follow a similar course on the second carrier 4' and be reduced to uniform length, and finally discharged as a grade separate from the first grade. Thus, also, with the thickest shoots, which will follow their course on the third carrier 4".

It will thus be seen that the essential object of preserving the initial uniformity of relation as to tips and butts, all the way through the machine from the feed, through the grader, and through the cutter, and in the discharge, is attained. The advantage is obvious, for if, after the grading, the uniformity of position were lost, as would be the case if the grader were not thus related to the cutter, it would require time and labor to rearrange them for the cutting operation.

Also in canning practice a marked advantage is had by making the grading precede the cutting, for it will be seen that by the necessity of employing a plurality of carriers, one for each grade all the grades may not only be cut for the same length but they may be cut for different lengths as well, by properly adjusting the cutters. Therefore they may be cut for long-stalks squares, or for tips, or for one pound talls, or two pound talls.

We claim:

1. A machine for the described purpose, comprising a grading means adapted to receive the shoots in uniform relation with respect to tips and butts and to sort them for thickness while preserving said relation; a plurality of traveling carriers adapted to separately receive said shoots in said relation from the grading means according to the respective grades and to advance and deliver them in said relation; and means operating on said shoots during their advance on the carrier for giving those of each grade uniform length.

2. A machine for the described purpose, comprising spaced grading-rolls adapted to receive the shoots in uniform relation with respect to tips and butts and to sort them for thickness while preserving such relation; a plurality of traveling carriers lying at their head-ends under said grading-rolls one under each grade zone thereof, and adapted to separately receive said shoots in said relation from each zone of the grade rolls respectively and to advance and deliver them in said relation; and means operating on said shoots during their advance on the carrier for giving those of each grade uniform length.

3. A machine for the described purpose, comprising a grading means adapted to receive the shoots in uniform relation with respect to tips and butts and to sort them for thickness while preserving said relation; a plurality of traveling carriers adapted to separately receive said shoots in said relation from the grading means according to the respective grades and to advance and deliver them in said relation; and means operating on said shoots during their advance on the carrier for giving those of each grade, uniform length, comprising means acting on the tips to shift the shoots endwise until the tips are even, and means acting on butts to cut the shoots to equal length.

4. A machine for the described purpose, comprising spaced grading-rolls adapted to receive the shoots in uniform relation with respect to tips and butts and sort them for thickness while preserving said relation; a plurality of traveling carriers lying at their head ends under said grading rolls one under each grade-zone thereof, and adapted to separately receive said shoots in said relation from each zone of the grade rolls respectively and to advance and deliver them in said relation; and means operating on said shoots during their advance on the carrier for giving those of each grade uniform length, comprising means acting on the tips to shift the shoots endwise until the tips are even, and means acting on the butts to cut the shoots to equal length.

5. A machine for the described purpose, comprising a grading means adapted to receive the shoots in uniform relation with respect to tips and butts and to sort them for thickness while preserving said relation; and associated devices for separately receiving and delivering each grade of shoots in said relation and reducing those of each grade to uniform length intermediate their reception and discharge.

In testimony whereof we have signed our names to this specification in the presence of two subscribing witnesses.

DAVID LOW,
ALBERT R. THOMPSON.

Witnesses:
WM. GAVIN,
F. P. BROWN.